United States Patent
Yeh et al.

(10) Patent No.: US 10,794,530 B2
(45) Date of Patent: Oct. 6, 2020

(54) ROTATING MODULE

(71) Applicant: SYNCMOLD ENTERPRISE CORP., New Taipei (TW)

(72) Inventors: Chien-Cheng Yeh, New Taipei (TW); Ching-Hui Yen, New Taipei (TW); Ze-Wei Li, New Taipei (TW)

(73) Assignee: SYNCMOLD ENTERPRISE CORP., New Taipei (TW)

(*) Notice: Subject to any disclaimer, the term of this patent is extended or adjusted under 35 U.S.C. 154(b) by 0 days.

(21) Appl. No.: 16/191,832

(22) Filed: Nov. 15, 2018

(65) Prior Publication Data
US 2019/0154192 A1     May 23, 2019

(30) Foreign Application Priority Data

Nov. 23, 2017 (TW) ............................. 106217398 U
Mar. 26, 2018 (TW) ............................. 107203874 U

(51) Int. Cl.
*F16M 11/04* (2006.01)
*F16M 11/12* (2006.01)
*F16M 11/18* (2006.01)
*F16M 11/10* (2006.01)
*F16M 11/08* (2006.01)

(52) U.S. Cl.
CPC .......... *F16M 11/126* (2013.01); *F16M 11/08* (2013.01); *F16M 11/10* (2013.01); *F16M 11/18* (2013.01); *F16M 2200/022* (2013.01)

(58) Field of Classification Search
CPC ..... F16M 11/126; F16M 11/18; F16M 11/041
USPC .... 248/176.3, 274.1, 276.1, 282.1, 580, 628
See application file for complete search history.

(56) References Cited

U.S. PATENT DOCUMENTS

| 6,554,238 | B1 * | 4/2003 | Hibberd | ............... | A47B 81/061 |
| | | | | | 248/278.1 |
| 6,863,252 | B2 * | 3/2005 | Bosson | ................ | F16M 11/041 |
| | | | | | 248/131 |
| 9,316,346 | B2 * | 4/2016 | Lau | ...................... | H05K 5/0204 |
| 2006/0261228 | A1 * | 11/2006 | Hung | .................... | F16M 11/10 |
| | | | | | 248/282.1 |

* cited by examiner

*Primary Examiner* — Todd M Epps
(74) *Attorney, Agent, or Firm* — Muncy, Geissler, Olds & Lowe, P.C.

(57) ABSTRACT

A rotating module comprising a mandrel and at least one rubbing element in provided. The at least one rubbing element is sleeved on the mandrel. The diameter of a pivoting space defined by an arcuate arm of the at least one rubbing element is smaller than the diameter of the mandrel so that the at least one rubbing element and the mandrel are assembled with interference fit.

18 Claims, 10 Drawing Sheets

ROTATING MODULE

CROSS REFERENCE TO RELATED APPLICATION

This application claims the benefits of the Taiwan Patent Application Serial Number 106217398, filed on Nov. 23, 2017, and Taiwan Patent Application Serial Number 107203874, filed on Mar. 26, 2018; the disclosures of which are incorporated by reference herein in their entirety.

BACKGROUND OF THE INVENTION

1. Field of the Invention

The present invention relates to a rotating module. More particularly, the present invention relates to a rotating module applied to a supporting stand.

2. Description of Related Art

A conventional supporting device typically includes an upright and a rotating module, wherein the rotating module usually comprises a shaft and a rotary unit being sleeved onto the shaft so that the display may swivel with respect to the upright. In order to stop the display at any swivel angle, there must be some interference between the rotary unit and the shaft.

However, when assembling the conventional supporting device, the interfered level between the rotary unit and the shaft may be designed based on the predetermined weight of the display which is scheduled to be mounted on the supporting device. Accordingly, the supporting device can only hold the display with the predetermined weight. If a display with different weight is mounted on the supporting device, the interfered level between the rotary unit and the shaft will be changed so that a user cannot adjust the display smoothly or cannot stop the display at any swivel angle.

SUMMARY OF THE INVENTION

An objective of the present invention is to provide a rotating module which supports the display at any horizontal or vertical view angle by the friction caused by the interference between at least one rubbing element and a mandrel. The friction may be altered by adjusting the number of the at least one rubbing element, the thickness of the at least one rubbing element, or the interference level between the at least one rubbing element and the mandrel so as to hold displays with different weights.

The rotating module of the present invention is disposed on an upright and connected to a holder for supporting a display. The rotating module comprises: at least one rubbing element including an arcuate arm and a connecting portion being integrally formed, wherein the arcuate arm forms a pivoting space, an opening connecting the pivoting space, and an inner surface adjacent to the pivoting space, wherein the connecting portion is connected to the upright; a mandrel including a pivoting part and at least one fixing part, wherein the pivoting part passes through the arcuate arm and contacts with the inner surface, and the at least one fixing part are connected to the holder; wherein the pivoting part of the mandrel and the arcuate arm are assembled with interference fit for the display pivotably stopping at any angle.

A tilt angle of the display is capable of being changed by applying a force to the display when an extending direction of the mandrel is perpendicular to the upright, and the display would stop at any tilt angle with respect to the upright when the force is removed. A swivel angle of the display is capable of being changed by applying a force to the display when the extending direction of the mandrel is parallel to the upright, and the display would stop at any swivel angle with respect to the upright when the force is removed.

In one embodiment, a diameter of the pivoting space and a diameter of the cross-section of the pivoting part are both constants, and the diameter of the pivoting space is smaller than the diameter of the cross-section of the pivoting part.

In one embodiment, the interference between the arcuate arm and the pivoting part decreases as the diameter of the pivoting space increases.

In one embodiment, the diameter of the cross-section of the pivoting part decreases from one end to the other end, and the diameter of the pivoting space decreases from one end to the other end corresponding the diameter of the cross-section of the pivoting part.

In one embodiment, the mandrel further includes a large-diameter part disposed between the at least one fixing part and the pivoting part. The diameter of the large-diameter part is larger than the diameter of the pivoting part. The arcuate arm is sleeved on the pivoting part and abuts against the large-diameter part.

In one embodiment, a thickness of each of the rubbing elements is not exactly the same; a material of each of the rubbing element is not exactly the same; and a curvature of the arcuate arm of each of the rubbing elements is not exactly the same.

In one embodiment, the at least one rubbing element is a single rubbing element.

The present invention provides another embodiment of the rotating module, which is disposed on an upright and connected to a holder for supporting a display. The rotating module comprises: a rubbing element including at least one arcuate arm and a connecting portion, wherein the at least one arcuate arm forms a pivoting space, an opening connected to the pivoting space, and an inner surface adjacent to the pivoting space, wherein the connecting portion is connected to the upright; a mandrel including a pivoting part and at least one fixing part, wherein the pivoting part passes through the at least one arcuate arm and contacts with the inner surface, and the at least one fixing part is connected to the holder; wherein the pivoting part on the mandrel is disposed in the arcuate arm with interference fit for the display pivotably stopping at any angle.

A tilt angle of the display is capable of being changed by applying a force to the display when an extending direction of the mandrel is perpendicular to the upright, and the display would stop at any tilt angle with respect to the upright when the force is removed. A swivel angle of the display is capable of being changed by applying a force to the display when the extending direction of the mandrel is parallel to the upright, and the display would stop at any swivel angle with respect to the upright when the force is removed.

In one embodiment, the mandrel further includes a large-diameter part connected to the pivoting part. A diameter of the large-diameter part is larger than a diameter of the pivoting part, wherein the at least one arcuate arm is sleeved on the pivoting part and abuts against the large-diameter part.

In one embodiment, the interference between the at least one arcuate arm and the pivoting part decreases as the diameter of the pivoting space increases.

In one embodiment, the at least one fixing part includes a first fixing part and a second fixing part. The first fixing part includes a first opening essentially fitting to an end of the large-diameter part. The second fixing part includes a second opening essentially fitting to an end of the pivoting part.

In one embodiment, the at least one arcuate arm includes a plurality of arcuate arms, which are stackably sleeved on the pivoting part.

In one embodiment, a thickness of each of the arcuate arms is not exactly the same; a material of each of the arcuate arms is not exactly the same; and a curvature of each of the arcuate arms is not exactly the same.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
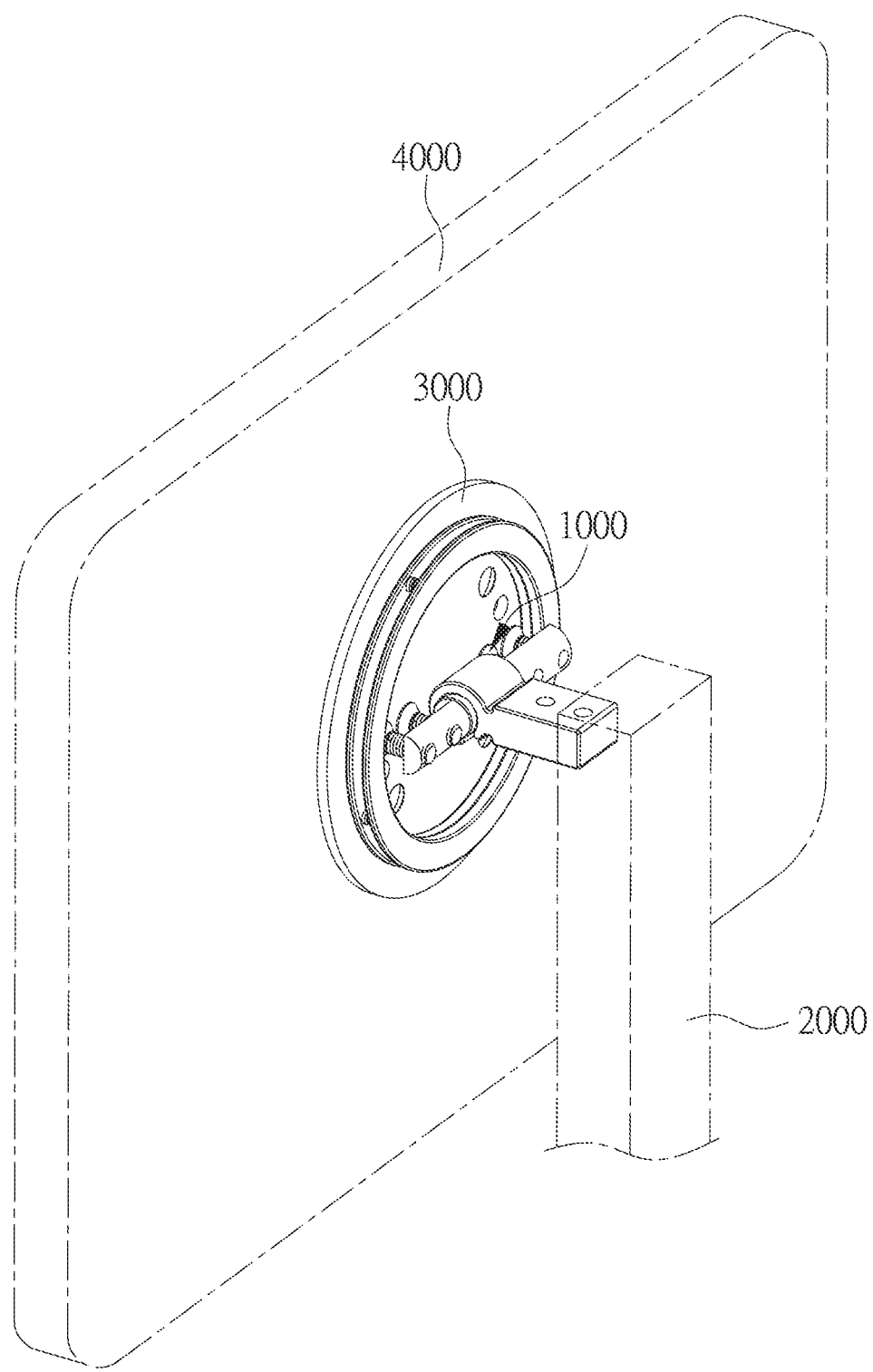
FIG. 1 is a perspective view of a rotating module in accordance with an embodiment of the present invention.
Figure 2:
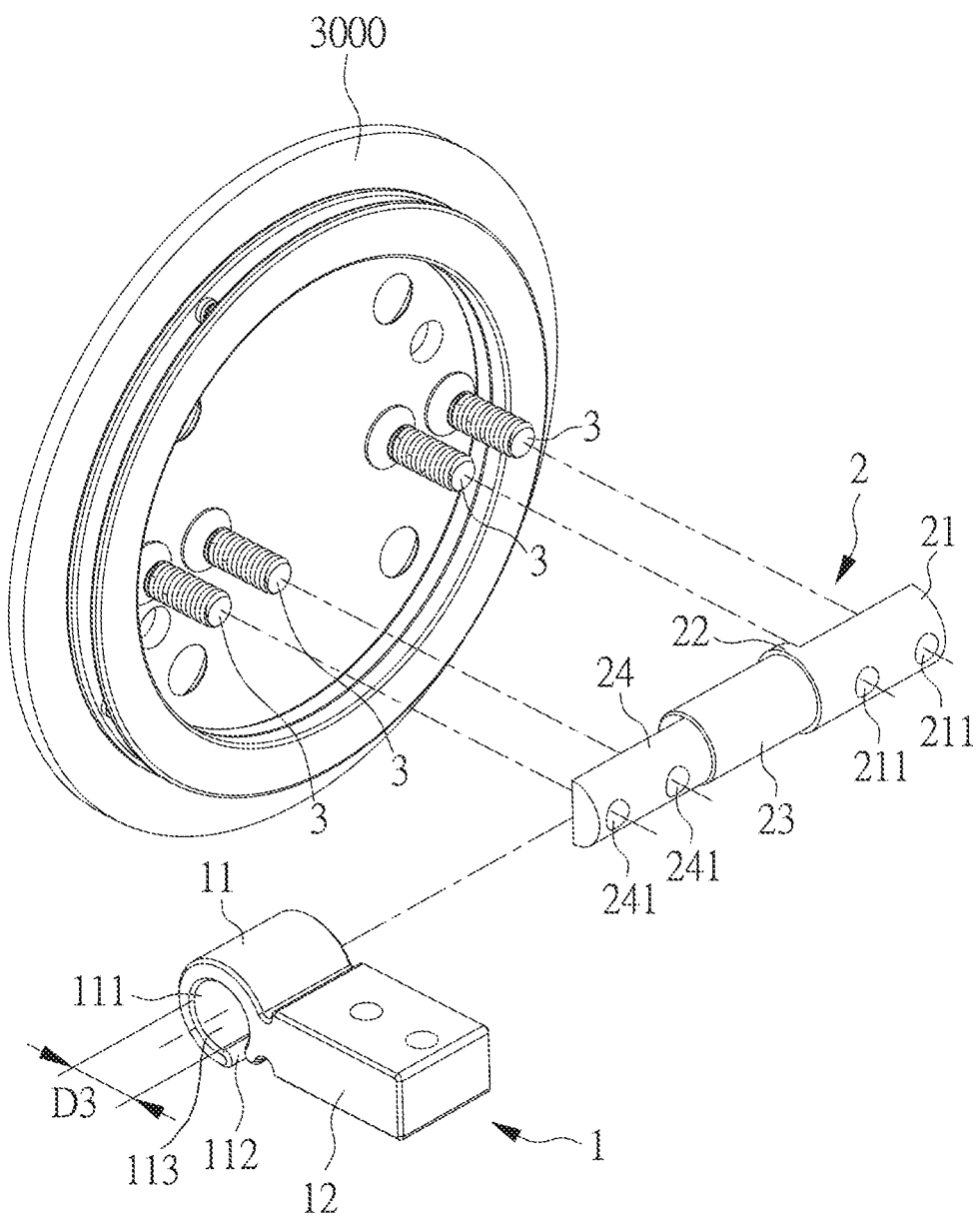
FIG. 2 is an exploded perspective view of the rotating module in accordance with the embodiment of the present invention.
Figure 3:
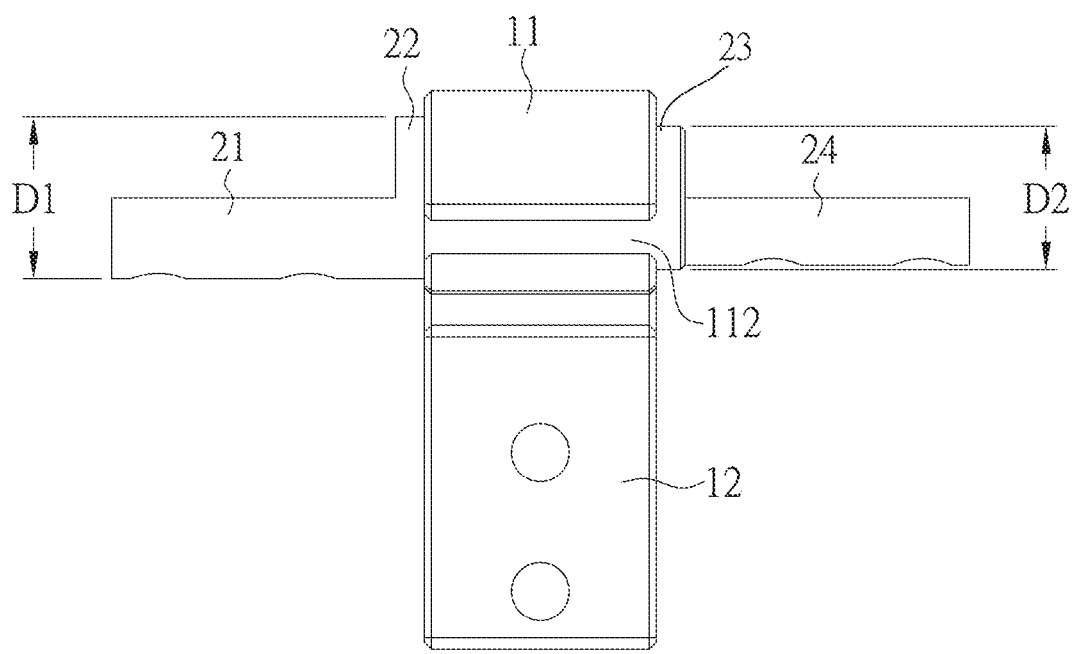
FIG. 3 is a bottom view of the rotating module in accordance with the embodiment of the present invention.

Please refer to the perspective view of the rotating module 1000 illustrated in FIG. 1, wherein the rotating module 1000 is disposed on an upright 2000, which is disposed on a working surface (not shown in figures), and connecting to a holder 3000 for supporting a display 4000. Please also refer to the exploded perspective view of the rotating module 1000 illustrated in FIG. 2 showing the rotating module 1000 mainly comprises a rubbing element 1 and a mandrel 2.

The rubbing element 1 includes an arcuate arm 11 and a connecting portion 12, which are integrally formed. The arcuate arm 11 forms and defines a pivoting space 111. The arcuate arm 11 also has an opening 112 and an inner surface 113 adjacent to the pivoting space 111. The rotating module 1000 connects to the upright 2000 via the connecting portion 12.

The mandrel 2 includes a first fixing part 21, a large-diameter part 22, a pivoting part 23, and a second fixing part 24, sequentially. The pivoting part 23 passes through the arcuate arm 11, contacts with the inner surface 113, and has interference fit with the arcuate arm 11. The first fixing part 21 and the second fixing part 24 extend from the pivoting part 23 and reach out of the arcuate arm 11. In order to connect to the holder 3000 by using four screws 3, the first fixing part 21 has two screw holes 211, and the second fixing part 24 has two screw holes 241. Please refer to the bottom view of the rotating module 1000. The large-diameter part 22 is formed between the pivoting part 23 and the first fixing part 21, wherein the diameter D1 of the cross-section of the large-diameter part 22 must be larger than the diameter D2 of the cross-section of the pivoting part 23. Accordingly, when the arcuate arm 11 is sleeved on the pivoting part 23, the arcuate arm 11 abuts against the large-diameter part 22 so that the arcuate arm 11 may be accurately positioned during the assembling process.

In the present embodiment, the diameter D3 of the pivoting space 111 and the diameter D2 of the cross-section of the pivoting part 23 are both constants, and the diameter D3 of the pivoting space 111 is slightly smaller than the diameter D2 of the cross-section of the pivoting part 23. As a result, the arcuate arm 11 and the pivoting part 23 is capable of being tightly engaged to each other so that the pivoting part 23 and the arcuate arms 11 would have interference fit therebetween. However, the rubbing element 1 may still operatively rotate with respect to the mandrel 2. The interference between the arcuate arm 11 and the pivoting part 23 decreases as the diameter D3 of the pivoting space 111 increases, alternatively, as the diameter D2 of the cross-section of the pivoting part 23 decreases.

In the present embodiment, the large-diameter part 22 is integrally formed between the pivoting part 23 and the first fixing part 21. However, in other embodiments of the present invention, the large-diameter part 22 may be a ring being fixed between the pivoting part 23 and the first fixing part 21 for the arcuate arm 11 abutting against.

Figure 4:
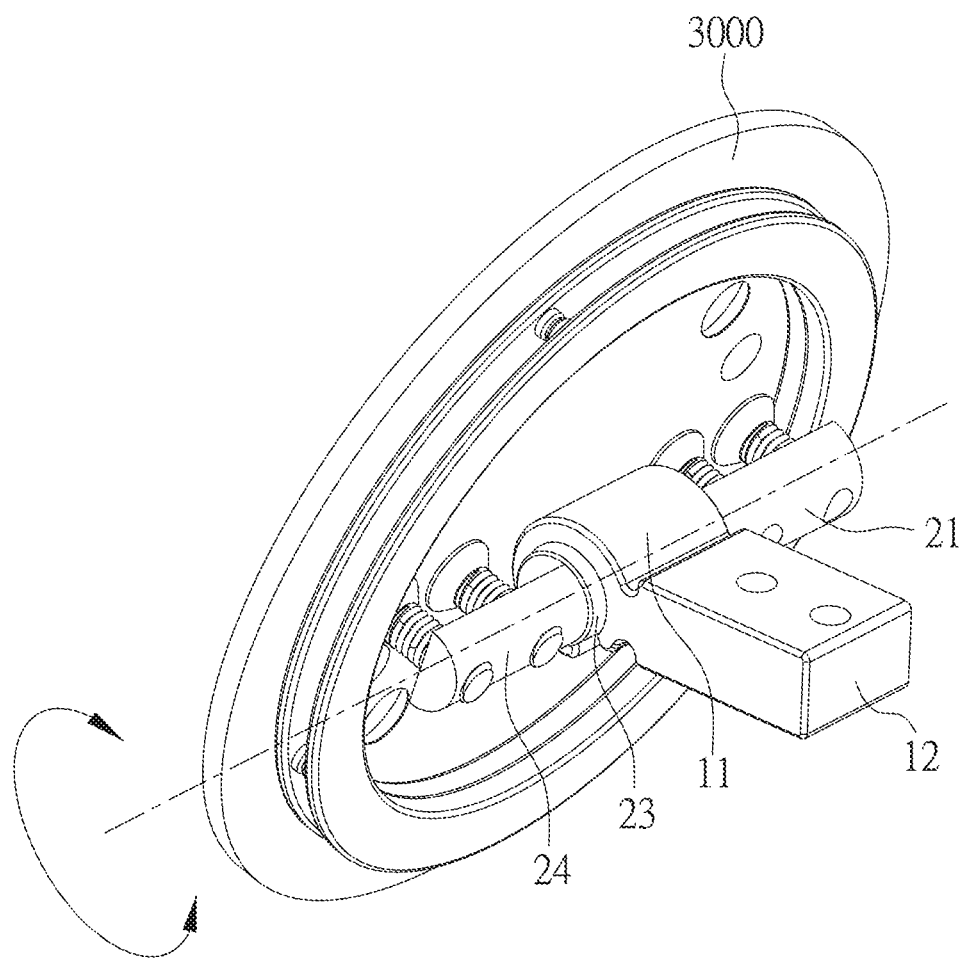
FIG. 4 is an operational view of the rotating module in accordance with the embodiment of the present invention.

Please further refer to FIG. 4. In the present embodiment, the extending direction of the mandrel 2 of the rotating module 1000 is perpendicular to the upright 2000. Therefore, a tilt angle of the display 4000 may be changed by applying a force to the display 4000 or the holder 3000. Also, the display 4000 may stop at any tilt angle with respect to the upright 2000 when the force is removed.

In addition, the rubbing element 1 of the present embodiment is made by powder metallurgy with mixed powder of iron, palladium, and nickel. However, the material of the rubbing element 1 is not limited thereto and may be replaced by other materials.

In other embodiments, the location of the opening 112 of the arcuate arm 11 is not particularly limited. The location of the opening 112 may affect the intensity of the force applied for rotating the rotating module 1000 in different directions. Accordingly, the location of the opening 112 may be determined based on user's need. For instance, in the rotating module 1000 illustrated in FIG. 1, the opening 112 of the arcuate arm 11 is formed adjacent to the connecting portion 12 and facing toward the working surface. When the tilt angle of the holder 3000 is adjusted to that as illustrated in FIG. 4, the force applied to the holder 3000 should be more intense to resist the friction between the arcuate arm 11 and the pivoting part 23; on the contrary, the force applied to the holder 3000 may be less intense when the holder 3000 is inclined to the opposite direction.

In another embodiment, it is feasible to have a plurality of rubbing elements 1. The rubbing elements 1 are sleeved on the pivoting part 23 of the mandrel 2 simultaneously, and connected to the upright 2000 via connecting portions 12 thereof respectively. The bearing weight of the holder 3000 may be adjusted by changing the number of the rubbing element 1.

In yet another embodiment, the diameter D2 of the cross-section of the pivoting part 23 decreases from one end to the other end, so that the pivoting part 23 is a frustum cone. The diameter D3 of the pivoting space 111 also decreases from one end to the other end in order to correspond to the diameter D2 of the cross-section of the pivoting part 23 so as to remain the interference fit between the pivoting part 23 and the arcuate arm 11.

Figure 5:
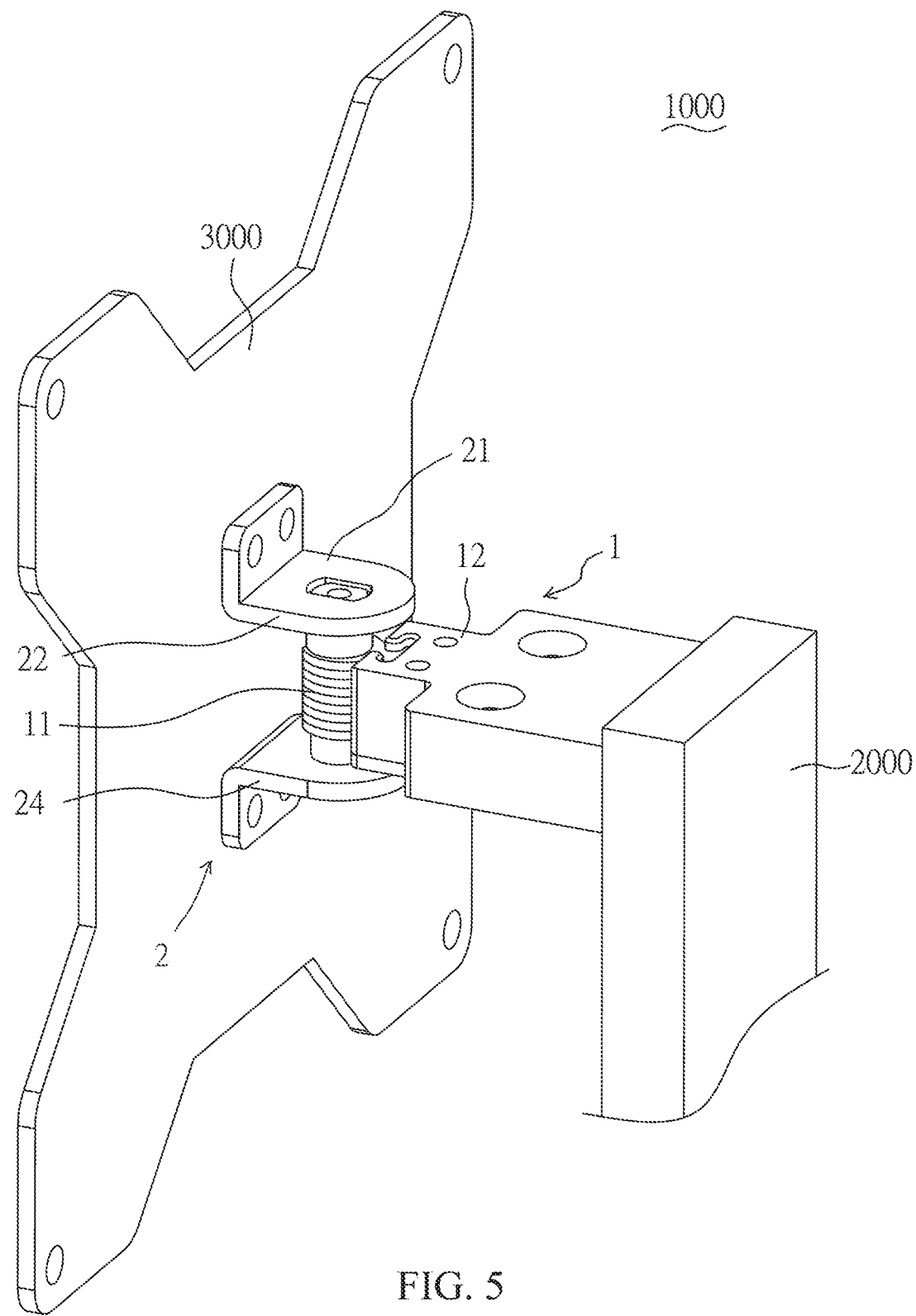
FIG. 5 is a perspective view of a rotating module in accordance with another embodiment of the present invention.

Furthermore, in another embodiment of the present invention, the arcuate arm 11 and the connecting portion 12 are separated, and the number of the arcuate arm 11 may be plural. Please refer to the perspective view of the rotating module 1000 illustrated in FIG. 5 and the exploded perspective view of the rotating module 1000 illustrated in FIG. 6, wherein the rotating module 1000 is disposed on an upright 2000. The rotating module 1000 mainly comprises a rubbing element 1 and a mandrel 2, wherein the rubbing element 1 includes nine arcuate arms 11, and a connecting portion 12. The connecting portion 12 connects to the upright 2000.

Figure 7:
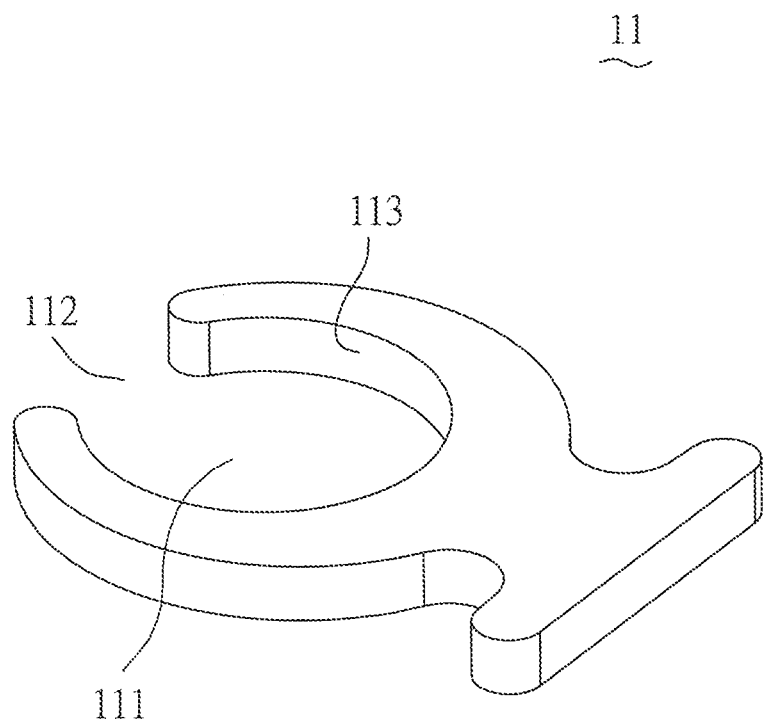
FIG. 7 is a perspective view of the arcuate arm in accordance with the embodiment of the present invention.

Each of the arcuate arms 11 of the present embodiment has the same shape and size, and one of the arcuate arms 11 is illustrated in FIG. 7. The arcuate arm 11 comprises a pivoting space 111, an opening 112 and an inner surface 113. In addition, the arcuate arms 111 are sequentially stacked and sleeved on the mandrel 2, and the inner surfaces 113 of the arcuate arms 11 contact with the mandrel 2.

Figure 6:
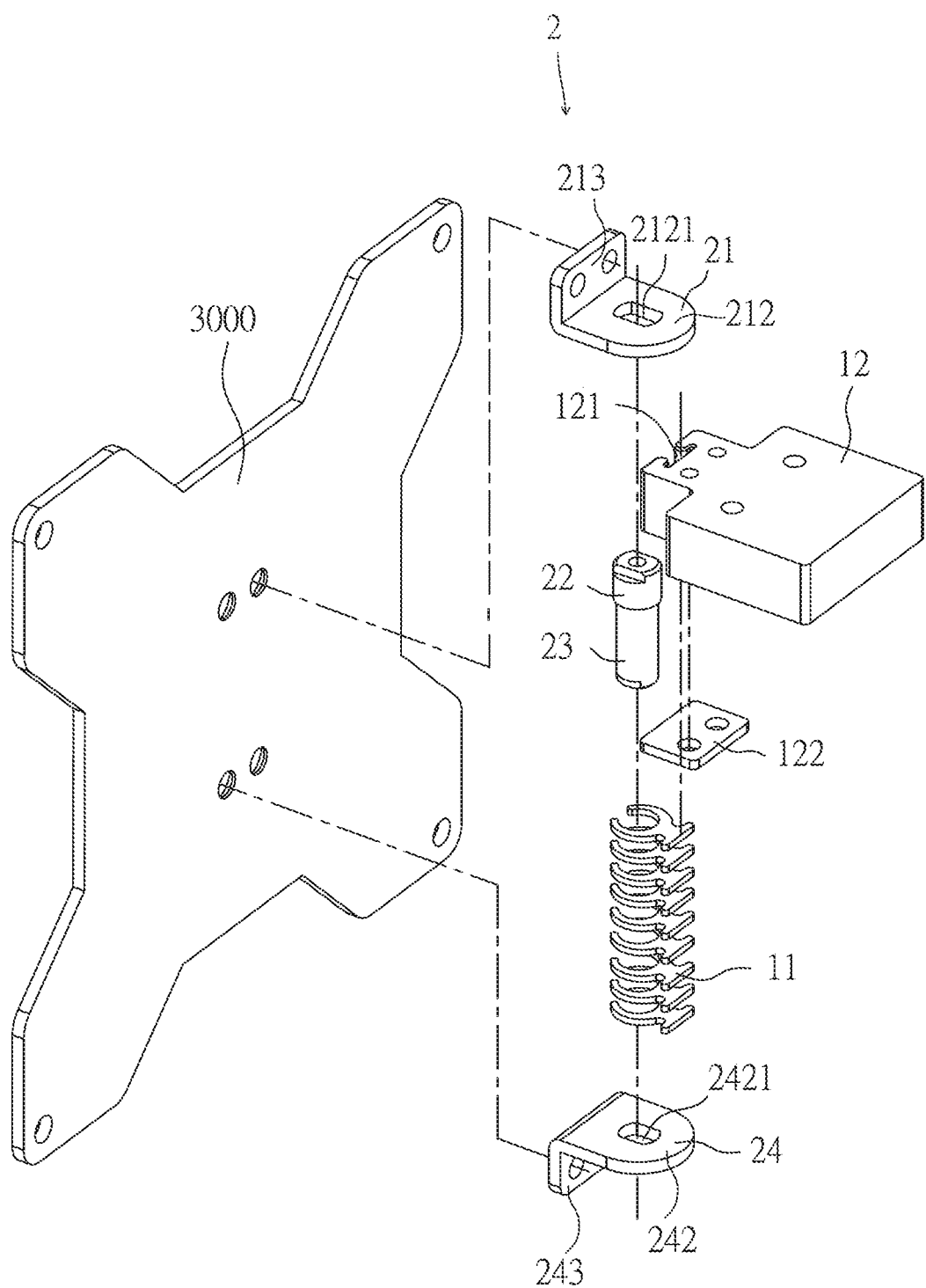
FIG. 6 is an exploded perspective view of the rotating module in accordance with the embodiment of the present invention.
Figure 8:
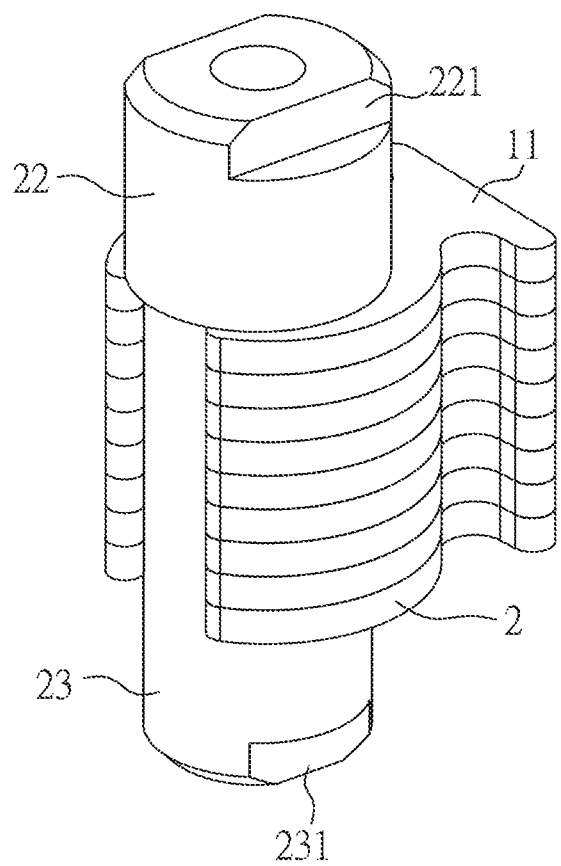
FIG. 8 is a perspective view of the arcuate arms and the mandrel in accordance with the embodiment of the present invention.

The mandrel 2 rotatably passes through the pivoting spaces 111 and includes a first fixing part 21, a large-diameter part 22, a pivoting part 23, and a second fixing part 24, wherein the large-diameter part 22 and the pivoting part 23 are connected to each other. As shown in FIG. 6 and FIG. 8, the large-diameter part 22 has two first recesses 221 distant from the pivoting part 23 for assembling with the first fixing part 21, and the pivoting part 23 has two second recesses 231 distant from the large-diameter part 22 for assembling the second fixing part 24. As illustrated in FIG. 8, the arcuate arm 11 located at the most top position abuts against the large-diameter part 22 for preventing the displacement of the arcuate arms 11.

Figure 9:
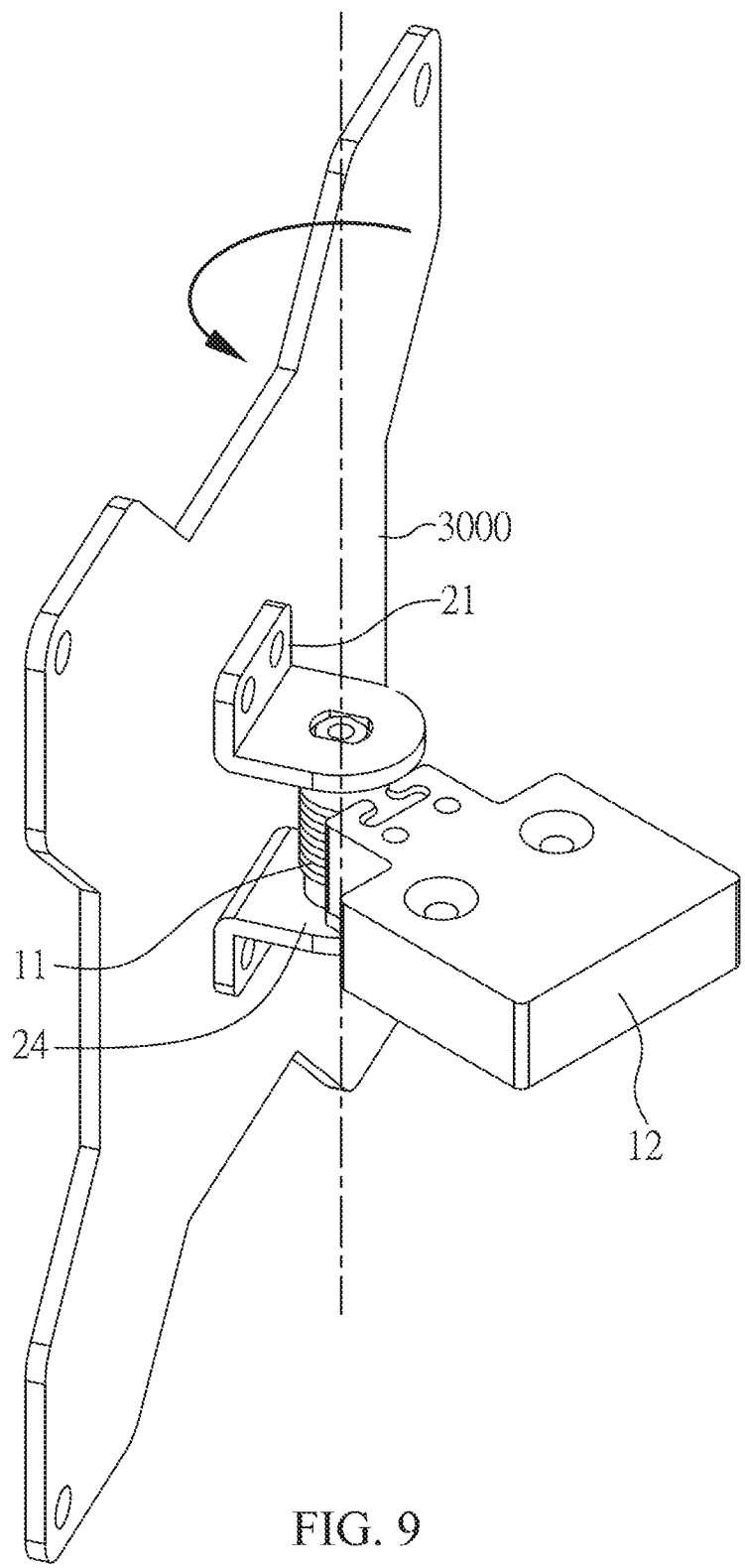
FIG. 9 is an operational view of the rotating module in accordance with the embodiment of the present invention.

Specifically, please refer to FIG. 8 and FIG. 9, the diameter of each of the pivoting spaces 111 of the arcuate arms 11 is slightly smaller than the diameter of the pivoting part 23 of the mandrel 2. Accordingly, the interference between the arcuate arms 11 and the mandrel 2 may occur; hence, the arcuate arms 11 are capable of being tightly sleeved on the mandrel 2 so that the mandrel 2 and the arcuate arms 11 are assembled with interference fit. However, the arcuate arms 11 may still pivotally rotate with respect to the mandrel 2.

The first fixing part 21 includes a first plate 212 and a second plate 213, which are perpendicular to each other. The second fixing part 24 also includes a first plate 242 and a second plate 243, which are perpendicular to each other. The first plate 212 of the first fixing part 21 has a first opening 2121, wherein the first opening 2121 is assembled with one end of the large-diameter part 22 of the mandrel 2. The first opening 2121 has a contour that essentially fits to the end of the large-diameter part 22. Therefore, the first opening 2121 engages with the two first recesses 221, and the first fixing part 21 may further be fixed to the large-diameter part 22 by using a screw (not shown in figures). Similarly, the first plate 242 of the second fixing part 24 has a second opening 2421, wherein the second opening 2421 is assembled with one end of the pivoting part 23. The second opening 2421 has a contour that essentially fits to the second recesses 231, and the second fixing part 24 may further be fixed to the pivoting part 23 by using a screw (not shown in figures).

In accordance, the first fixing part 21 and the second fixing part 24 are engaged with the large-diameter part 22 and the pivoting part 23 respectively so that the large-diameter part 22 and the pivoting part 23 can be fixed and will not rotate with respect to the first fixing part 21 and the second fixing part 24. Furthermore, the holder 3000 is fixed to the second plates 213, 243 of the first fixing part 21 and the second fixing part 24, and the holder 3000 is applied for carrying a display (not shown in figures).

The connecting portion 12 includes a slot 121 and a stopper 122, wherein the slot 121 has a cross-section that corresponds to the external contour of a portion of the arcuate arms 11. More specifically, the cross-section of the slot 121 has a dovetail shape to accommodate the portion of the arcuate arms 11. The arcuate arms 11 may be tightly engaged to the slot 121 so that each of the arcuate arms 11 being stackably sleeved on the pivoting part 23 may be fixed to the connecting portion 12. In addition, the stopper 122 is fastened to the bottom of the slot 121 to enclose the opening beneath the slot 121. Hence, the arcuate arms 11 will not be detached from the slot 121 due to gravity.

The abovementioned embodiment is designed without using any springs; therefore, the assembling process would be simplified. When the weight of the display 4000 carried by the holder 3000 varies, the bearing force may be altered by adjusting the number of the arcuate arms 11 being stackably sleeved on the pivoting part 23. Also, since the arcuate arms 11 are made with same size and shape, it would reduce the complexity of the manufacturing processes.

In addition, instead of adjusting the number of the arcuate arms 11, the arcuate arms 11 with different standards, such as different thickness, different curvatures, and different materials, may be used to adjust the total interference between the arcuate arms 11 and the pivoting part 23. For example, the interference between the arcuate arm 11 and the pivoting part 23 may decrease while the diameter of the pivoting space 111 increases. Therefore, the adjustment may be accomplished by using the arcuate arms 11 with different standards.

Figure 10:
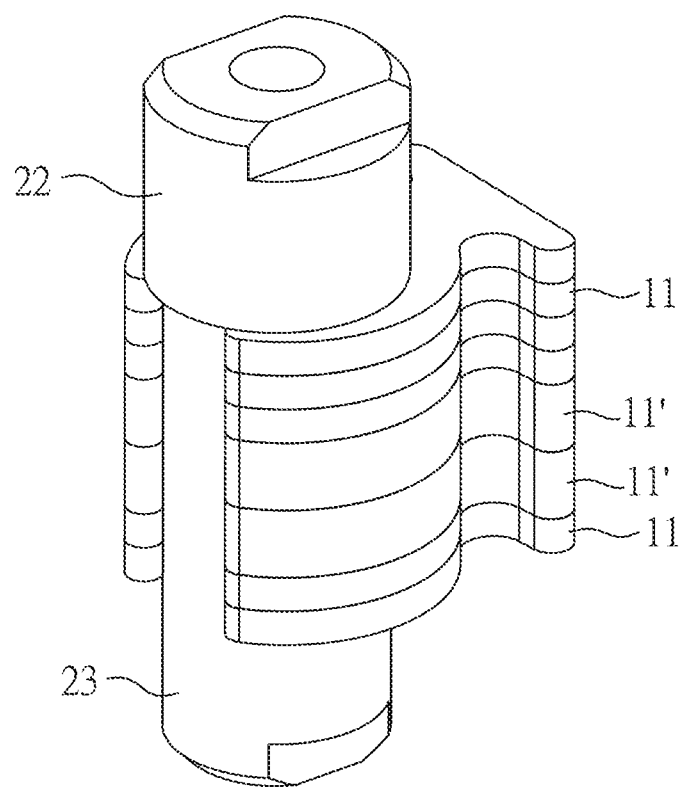
FIG. 10 is another perspective view of the arcuate arms and the mandrel in accordance with another embodiment of the present invention.

Please refer to FIG. 10, which illustrates that some of the arcuate arms 11' have different thickness. As illustrated in the figure, the combinations of different arcuate arms 11, 11' is able to adjust the interference to balance the weight of the display.

In addition, the disposing direction and position of the rubbing element 1 and the mandrel 2 may be designed as needed in order to adjust the display 4000 with the tilt angle, the portrait/landscape rotate angle, or the swivel angle along the upright 2000. For example, when the extending direction of the mandrel 2 is parallel to the upright 2000, a force may be applied to the display 4000 to change the swivel angle of the display 4000, and when the force is removed, the display 4000 may stop at any desired swivel angles with respect to the upright 2000. For another example, when the extending direction of the mandrel 2 is perpendicular to the upright 2000, a force may be applied to the display 4000 to change the tilt angle of the display 4000, and when the force is removed, the display 4000 may stop at any desired tilt angles with respect to the upright 2000.

In summary, the friction provided by the rotating module of the present invention may be altered by adjusting the number or the thickness of the arcuate arms of the rubbing element, to adjust the interference level between the arcuate arms and the pivoting part. Accordingly, the rotating module may be applied with displays with different weights; therefore, it is not necessary to customize the rotating module for displays with different weight.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A rotating module being disposed on an upright and connected to a holder for supporting a display, the rotating module comprising:
   at least one rubbing element including at least one arcuate arm and a connecting portion, wherein the arcuate arm forms a pivoting space, an opening being connected to the pivoting space, and an inner surface adjacent to the pivoting space, wherein the connecting portion is connected to the upright; and
   a mandrel including a pivoting part and at least one fixing part, wherein the pivoting part passes through the arcuate arm and contacts with the inner surface, and the at least one fixing part is connected to the holder;
   wherein the pivoting part of the mandrel and the arcuate arm are assembled with interference fit for the display pivotably stopping at any angle;
   wherein a tilt angle of the display is capable of being changed by a force applied to the display when an extending direction of the mandrel is perpendicular to the upright, and the display stops at any tilt angle with respect to the upright when the force is removed; wherein a swivel angle of the display is capable of being changed by a force applied to the display when the extending direction of the mandrel is parallel to the upright, and the display stops at any swivel angle with respect to the upright when the force is removed.

2. The rotating module of claim 1, wherein the arcuate arm and the connecting portion are integrally formed.

3. The rotating module of claim 2, wherein the diameter of the cross-section of the pivoting part decreases from one end to the other end, and the diameter of the pivoting space decreases from one end to the other end corresponding to the diameter of the cross-section of the pivoting part.

4. The rotating module of claim 2, wherein the mandrel further includes a large-diameter part disposed between the at least one fixing part and the pivoting part, wherein a diameter of the large-diameter part is larger than the diameter of the pivoting part, and the arcuate arm is sleeved on the pivoting part and abuts against the large-diameter part.

5. The rotating module of claim 2, wherein the at least one rubbing element is a single rubbing element.

6. The rotating module of claim 2, wherein a diameter of the pivoting space and a diameter of a cross-section of the pivoting part are both constants, and the diameter of the pivoting space is smaller than the diameter of the cross-section of the pivoting part.

7. The rotating module of claim 6, wherein the interference between the arcuate arm and the pivoting part decreases as the diameter of the pivoting space increases.

8. The rotating module of claim 7, wherein a thickness of each of the rubbing elements is not identical.

9. The rotating module of claim 7, wherein a material of each of the rubbing elements is not identical.

10. The rotating module of claim 7, wherein a curvature of the arcuate arm of each of the rubbing elements is not identical.

11. The rotating module of claim 1, wherein the mandrel further includes a large-diameter part connected to the pivoting part, wherein a diameter of the large-diameter part is larger than a diameter of the pivoting part, and the at least one arcuate arm is sleeved on the pivoting part and abuts against the large-diameter part.

12. The rotating module of claim 11, wherein the interference between the at least one arcuate arm and the pivoting part decreases as the diameter of the pivoting space increases.

13. The rotating module of claim 1, wherein the at least one fixing part includes a first fixing part and a second fixing part, wherein the first fixing part includes a first opening essentially fitting to an end of the large-diameter part, and the second fixing part includes a second opening essentially fitting an end of the pivoting part.

14. The rotating module of claim 1, wherein the connecting portion further comprises a slot for the arcuate arm being tightly engaged therein.

15. The rotating module of claim 1, wherein the at least one arcuate arm includes a plurality of arcuate arms being stackably sleeved on the pivoting part.

16. The rotating module of claim 15, wherein a thickness of each of the arcuate arms is not identical.

17. The rotating module of claim 15, wherein a material of each of the arcuate arms is not identical.

18. The rotating module of claim 15, wherein a curvature of each of the arcuate arms is not identical.

* * * * *